Oct. 9, 1923.  1,470,401
C. V. SORENSEN ET AL
BRICK SILO
Filed Nov. 6, 1920
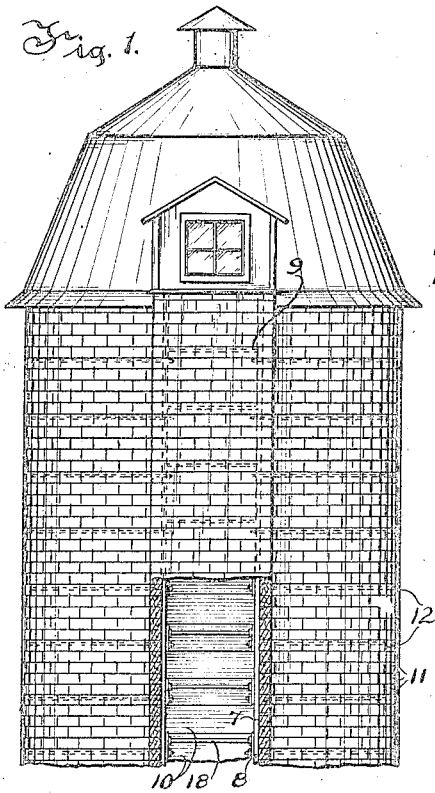
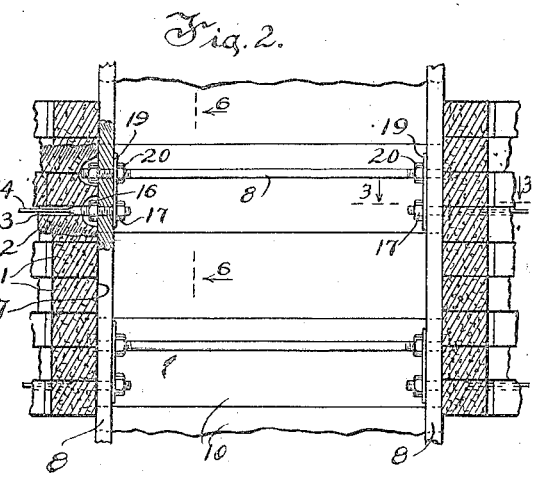
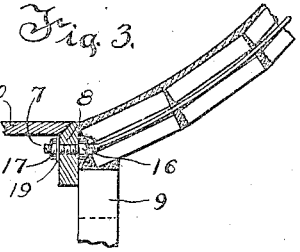
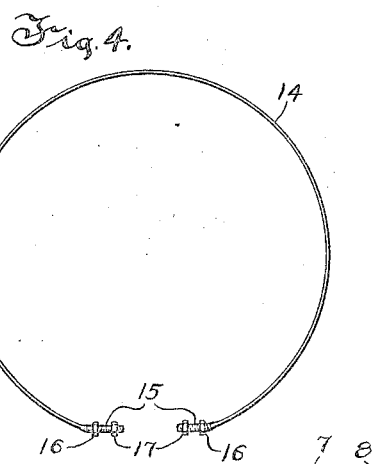
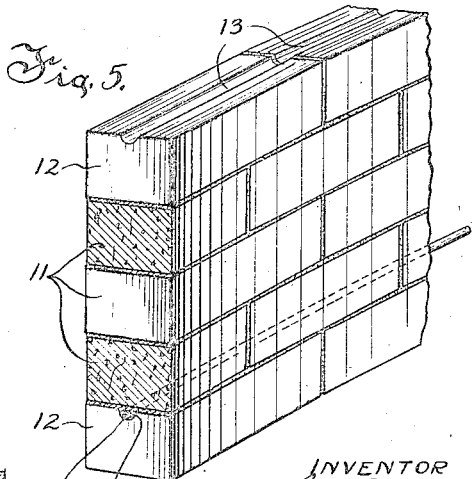
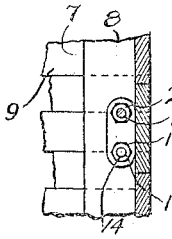

Patented Oct. 9, 1923.

1,470,401

UNITED STATES PATENT OFFICE.

CHRIS. V. SORENSEN AND HERBERT H. PANSCH, OF RACINE, WISCONSIN.

BRICK SILO.

Application filed November 6, 1920. Serial No. 422,260.

*To all whom it may concern:*

Be it known that we, CHRIS V. SORENSEN and HERBERT H. PANSCH, citizens of the United States, and residents of Racine, in the county of Racine and State of Wisconsin, have invented new and useful Improvements in Brick Silos, of which the following is a description, reference being had to the accompanying drawings, which are a part of this specification.

The invention relates to brick silos.

The general object of the invention is to provide simple and effective reinforcement for the brick walls of the silo.

The invention further consists in the several features hereinafter set forth and more particularly defined by claim at the conclusion hereof.

In the drawings, Fig. 1 is a view of a brick silo embodying the invention, parts being broken away; Fig. 2 is an enlarged sectional view showing details of construction; Fig. 3 is a section taken on the line 3—3 of Fig. 2; Fig. 4 is a detail view of one of the reinforcing members; Fig. 5 is a detail view of the wall; Fig. 6 is a section taken on the line 6—6 of Fig. 2.

As is usual, the wall of the silo is circular in cross section having a vertical extending opening 7 faced by jambs 8 with a walled passage 9 adjacent said opening 7 and forming a filling and discharge passage, the usual sectional doors 10 being provided to cover opening 8 and separate the interior of the silo from the passage 9.

The silo wall is formed of courses 11 and 12 of brick either of composition of clay or cement. The brick courses 11 are of plain brick. The brick courses 12 comprise bricks having longitudinally extending grooves 13 preferably in the top side thereof. The brick courses containing the grooved brick are in every fifth course or these courses may be spaced at any desired number of courses from each other.

Reinforcing members 14 in the form of round steel rods are laid in the circular grooves formed by the grooves 13 and are cemented into these grooves and thus disposed at spaced intervals between the courses of brick forming the silo wall. These rods 14 have enlarged ends 5 threaded to receive clamping nuts 16 and 17. The ends 15 of the rods are passed through openings in the jambs 8 and clamped to said jambs by tightening the nuts 16 and 17 against the jamb.

The usual rods 18 are secured to the jambs 8 and form a ladder and we prefer to further brace the jamb where the rods 18 and 14 connect with it by means of washers or plates 19 which have openings receiving the threaded ends of the rods 14 and 18 and which are clamped to the jambs by the nuts 17 on the rod 14 and the nuts 20 on the rods 18. The rods 14 cooperate with the jambs 8 to form a reinforcement for the brick walls and as they are placed below the level of the brick they do not interfere with the building up of the wall structure in the usual manner.

We desire it to be understood that this invention is not limited to any specific form or arrangement of parts except in so far as such limitations are specified in the claim.

What we claim as our invention is:

A circular silo having brick walls with a vertically extending opening, jambs at the sides of said opening, spaced rods having threaded ends extending through the jambs, plates abutting the inner sides of the jamb and mounted on said rods, nuts on the ends of said rods clamping the jambs and plates between them, the brick in some of the courses having longitudinally extending recesses forming substantially circular grooves, solid metal reinforcing rods disposed in said grooves and having threaded ends passing through the jambs and through openings in said plates, and nuts on the threaded ends of said reinforcing rods clamping said plates and jambs between them.

In testimony whereof, we affix our signatures, in presence of two witnesses.

CHRIS. V. SORENSEN.
HERBERT H. PANSCH.

Witnesses:
HAROLD JOHNSON,
WALTER D. LEOREN.